(12) United States Patent
Puleo

(10) Patent No.: US 7,954,532 B2
(45) Date of Patent: Jun. 7, 2011

(54) APPARATUS FOR FORMING HEMS WITH DOUBLE SIDED TAPE

(75) Inventor: Terry Puleo, Easley, SC (US)

(73) Assignee: U.S. Banner Corp., Greenville, SC (US)

( * ) Notice: Subject to any disclaimer, the term of this patent is extended or adjusted under 35 U.S.C. 154(b) by 292 days.

(21) Appl. No.: 11/725,673

(22) Filed: Mar. 20, 2007

(65) Prior Publication Data

US 2007/0246154 A1    Oct. 25, 2007

Related U.S. Application Data

(60) Provisional application No. 60/846,975, filed on Sep. 25, 2006.

(51) Int. Cl.
*D05B 35/02* (2006.01)

(52) U.S. Cl. ........ 156/463; 156/467; 156/468; 156/470; 112/142; 112/147; 112/475.06

(58) Field of Classification Search .................. None
See application file for complete search history.

(56) References Cited

U.S. PATENT DOCUMENTS

| | | | | |
|---|---|---|---|---|
| 3,906,878 A * | 9/1975 | Burton | ........................... | 112/423 |
| 4,261,272 A * | 4/1981 | Duescher | ...................... | 112/217 |
| 5,704,304 A * | 1/1998 | Burton et al. | ............ | 112/470.31 |
| 5,814,184 A * | 9/1998 | Denkins | ......................... | 156/577 |
| 6,732,781 B2 * | 5/2004 | Bouveresse | .................... | 156/577 |
| 6,769,466 B2 * | 8/2004 | Osumi et al. | .................. | 156/351 |
| 6,973,886 B2 * | 12/2005 | Marcangelo | .................. | 112/2.1 |
| 2003/0075258 A1 * | 4/2003 | Zhang et al. | .................... | 156/93 |
| 2003/0084984 A1 * | 5/2003 | Glaug et al. | .................. | 156/204 |
| 2005/0196585 A1 * | 9/2005 | Yu | ................................ | 428/102 |

\* cited by examiner

*Primary Examiner* — John L. Goff
*Assistant Examiner* — Barbara J. Musser
(74) *Attorney, Agent, or Firm* — J. Bennett Mullinax, LLC

(57) ABSTRACT

An apparatus for forming a hem is provided. The apparatus has a tape station for use in application of tape to a blank. A hemmer is used for folding the blank. A driving roller is present for use in moving the blank and for use in compressing the blank and the tape to form a hem. A method of forming a hem is also provided.

14 Claims, 6 Drawing Sheets

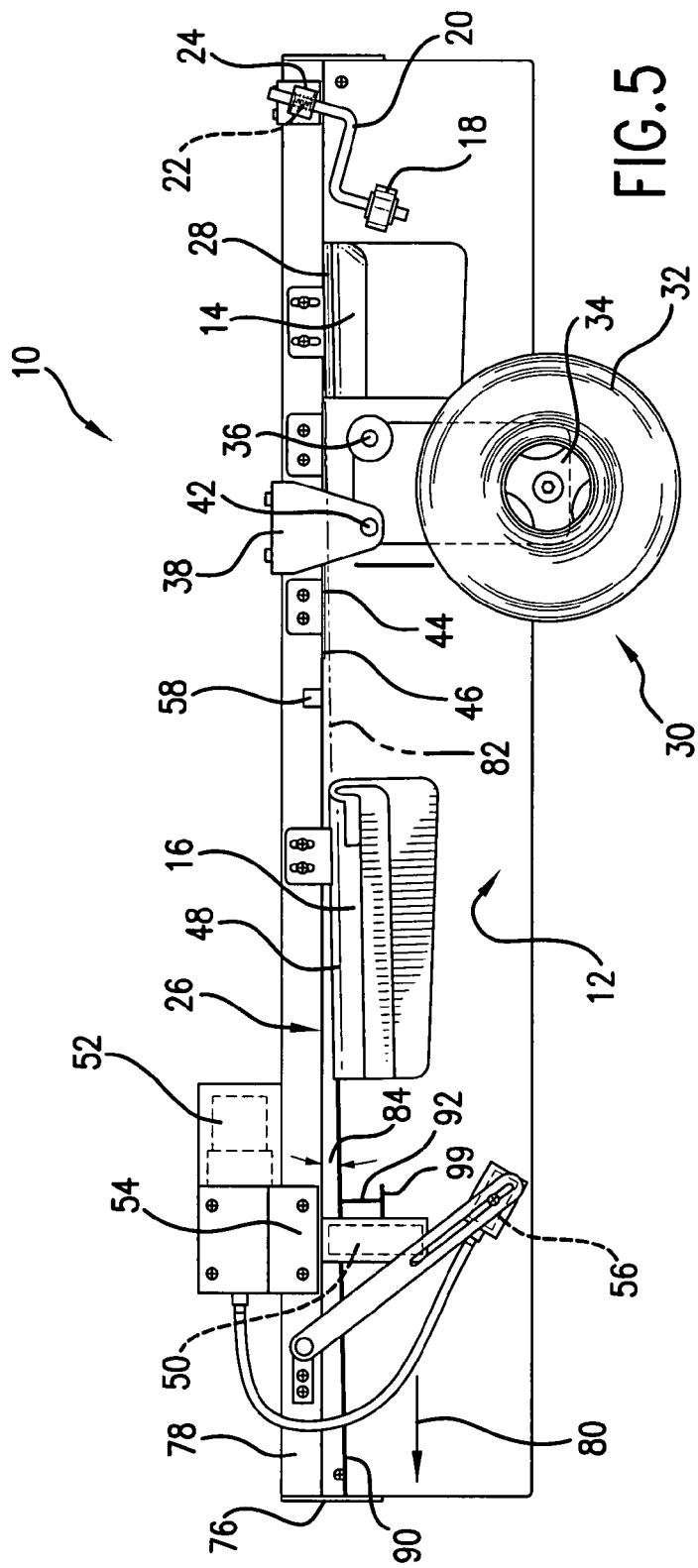
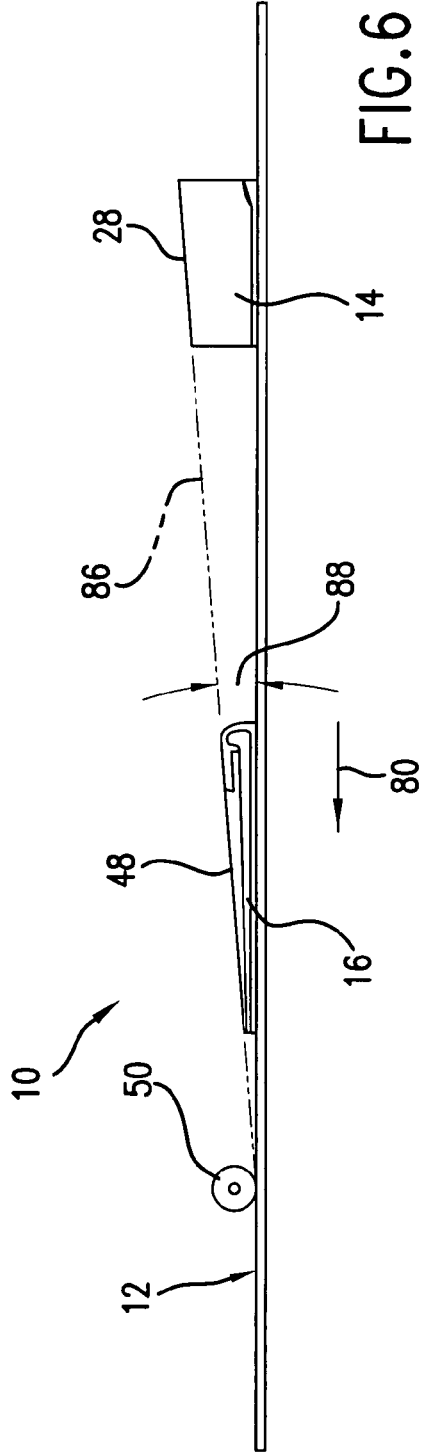
FIG. 5
FIG. 6 ion Ser. No. 60/846,975 is incorporated by reference herein in its entirety for all purposes.
APPARATUS FOR FORMING HEMS WITH DOUBLE SIDED TAPE

CROSS REFERENCE TO RELATED APPLICATION

This application claims the benefit of U.S. Application Ser. No. 60/846,975 filed on Sep. 25, 2006 and entitled, "Apparatus and Method for Forming Hems with Double Sided Tape." U.S. Application Ser. No. 60/846,975 is incorporated by reference herein in its entirety for all purposes.

FIELD OF THE INVENTION

The present invention relates generally to an apparatus for applying double sided tape to a piece of material in order to form a hem. More particularly, the present application is directed to an apparatus for quickly and accurately forming a hem at the edge of a banner. An associated method is also provided.

BACKGROUND

Hems are formed in banners in order to strengthen the material making up the banner. Additional strength is desirable when inserting grommets into banners for purposes of fastening the banner to a wall, balcony, window or other structure. A hem is formed along an edge of the banner and one or more grommets are applied thereon. A stronger connection is formed by having the grommet disposed through a hem of the banner as opposed to being disposed through a single layer of the material making up the banner.

Lettering or graphics may be applied to the banner either through hand painting or by using a computer to plot letters with adhesive backing (vinyl graphics) and then subsequently applying the letters to a banner that already has hems and grommets. Digital ink jet printers have recently been used to enable banner printers to print directly onto the banner. However, digital ink jet printers are not capable of accommodating a banner that has hems and grommets. It is therefore the case that digital ink jet printers print onto a banner that is then subsequently finished by having hems and grommets applied thereon. Sign shops and print shops will either apply hems and grommets in house or will send the printed banners to an outside vendor for application of these features.

Hems can be applied to printed banners in a number of manners. Sewing is one technique that can be used to form hems. However, sewing requires a skilled operator in addition to a sewing machine. Aside from general maintenance such as the calibration of timing, sewing machines commonly break down due to incidents such as broken needles and broken threads. Further, sewing a hem into a banner causes stitches to be present on the printed side of the banner. The stitches may be problematic in that they reduce the amount of area available for printing and can interfere with the printed image.

Another method used to form hems into banners involves the use of double sided tape. Here, the double sided tape is applied along the inside length of a banner proximate one of its edges. The paper or plastic strip on the exposed side of the tape is removed, and the edge of the banner is folded downward over the tape in order to affix it thereon. Formation of a hem with tape may be advantageous over sewing because it eliminates the presence of stitches on the printed side of the banner. Also, the formation of a hem with double sided tape generally requires less skill than forming a hem through sewing and consequently eliminates the need of maintenance, repair and downtime associated with the use of a sewing machine. Hemming with double sided tape is also advantageous over other methods of hem formation such as heat-sealing and sonic welding in that forming a hem with tape is considerably less expensive.

Although advantageous in certain aspects, forming hems with double sided tape poses various challenges. As tape is manually applied to banner material, the resulting hems may not be straight in every instance. For example, if the tape were initially applied at a slight angle, the tape could be significantly off-line towards the opposite end of the banner. This type of error is exacerbated when tape is applied to longer banners such as those measuring four or more feet. To correct an error in alignment, the worker may have to remove the tape or reapply the tape which results in a loss of material, time or both. The formation of hems with double sided tape may also be problematic in that bubbles or other irregularities can be produced when the edge of the banner is folded down onto the tape and adhered thereto. Aside from the problems of alignment and bubbles, current methods of forming hems into banners with the use of double sided tape are both labor and time intensive. Accordingly, there remains room for variation and improvement within the art.

SUMMARY

Various features and advantages of the invention will be set forth in part in the following description, or may be obvious from the description, or may be learned from practice of the invention.

One aspect of one exemplary embodiment includes an apparatus for forming a hem that has a tape station for use in application of tape to a banner. A hemmer is provided for use in folding the banner. A driving roller is present for use in moving the banner and for use in compressing the banner and the tape to form a hem.

Another aspect of one embodiment involves an apparatus as immediately mentioned that further includes a prefolder for applying a prefold to the banner. The tape station is located downstream from the prefolder in the machine direction. The hemmer is located downstream from the tape station in the machine direction. The driving roller is located downstream from the hemmer in the machine direction.

An additional aspect of another exemplary embodiment is found in an apparatus as mentioned above that further includes a linear edge. The axis of revolution of the driving roller is oriented so as to be perpendicular to the linear edge. The hemmer has an upper edge across which the banner moves. The upper edge of the hemmer is oriented at an angle with respect to the linear edge so that the banner is not parallel to the liner edge when the banner moves across the upper edge of the hemmer.

Another aspect of a further exemplary embodiment is found in an apparatus as previously discussed that further has a horizontal surface supporting the banner. The horizontal surface has a guide line to aid a user in positioning the banner on the horizontal surface. The horizontal surface has a stop line located between the hemmer and the driving roller to aid a user in positioning the banner at a stop point before passing the banner across the driving roller. The horizontal surface has a hem line to aid a user in folding the banner to form a hem of a desired size.

One aspect of one exemplary embodiment includes an apparatus for forming a hem. A prefolder is present for use in applying a prefold to a banner. A tape station is used for application of tape to the banner. The tape station is located downstream from the prefolder in the machine direction. A hemmer for use in folding the banner is likewise present. The hemmer is located downstream from the tape station in the machine direction.

Another aspect of one exemplary embodiment involves an apparatus as immediately discussed that also has a driving roller for use in moving the banner and for use in compressing the banner and the tape. The driving roller is located downstream from the hemmer in the machine direction.

An additional aspect of another exemplary embodiment is found in an apparatus as previously mentioned that further includes a tracking roller located upstream from the tape station in the machine direction. The tracking roller is biased so as to compress the banner. The axis of rotation of the tracking roller is at an angle to the machine direction so that the axis of rotation of the tracking roller is not perpendicular to the machine direction.

A further exemplary embodiment is found in an apparatus as previously discussed that has a linear edge. The hemmer has an upper edge across which the banner moves. The upper edge of the hemmer is oriented at an angle with respect to the linear edge so that the banner is not parallel to the liner edge when the banner moves across the upper edge of the hemmer. The prefolder has an upper edge across which the banner moves. The upper edge of the prefolder is oriented at an angle with respect to the linear edge so that the banner is not parallel to the liner edge when the banner moves across the upper edge of the prefolder.

Yet another aspect of an additional exemplary embodiment exists in an apparatus as mentioned above that has a horizontal surface. The upper edge of the prefolder is oriented at an angle with respect to the horizontal surface so that an edge of the banner is guided towards the horizontal surface as the banner moves across the prefolder in the machine direction. The upper edge of the hemmer is oriented at an angle with respect to the horizontal surface so that an edge of the banner is guided towards the horizontal surface as the banner moves across the hemmer in the machine direction.

Another aspect of a further exemplary embodiment includes a method of forming a hem that involves providing a banner and applying double sided tape to the banner. The method further includes the step of folding the banner such that the double sided tape acts to form a hem. An additional step includes automatically advancing the banner such that the applying step and the folding steps are accomplished automatically.

An additional exemplary embodiment resides in a method as immediately mentioned that further involves the steps of prefolding the banner before the applying step and compressing the banner after the folding step. A driving roller is used in order to accomplish the compressing step and the automatically advancing step.

Another aspect of another exemplary embodiment is present in a method as discussed above that further includes the steps of providing a linear edge and a horizontal surface. The automatically advancing step causes the banner to be moved away from the linear edge. The automatically advancing step causes the banner to be guided towards the horizontal surface.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 5 is a top view of the apparatus of FIG. 1.

FIG. 6 is a side view of the angular relationship between the prefolder, long arm hemmer, driving roller and horizontal surface of the apparatus of FIG. 1.

Figure 1:
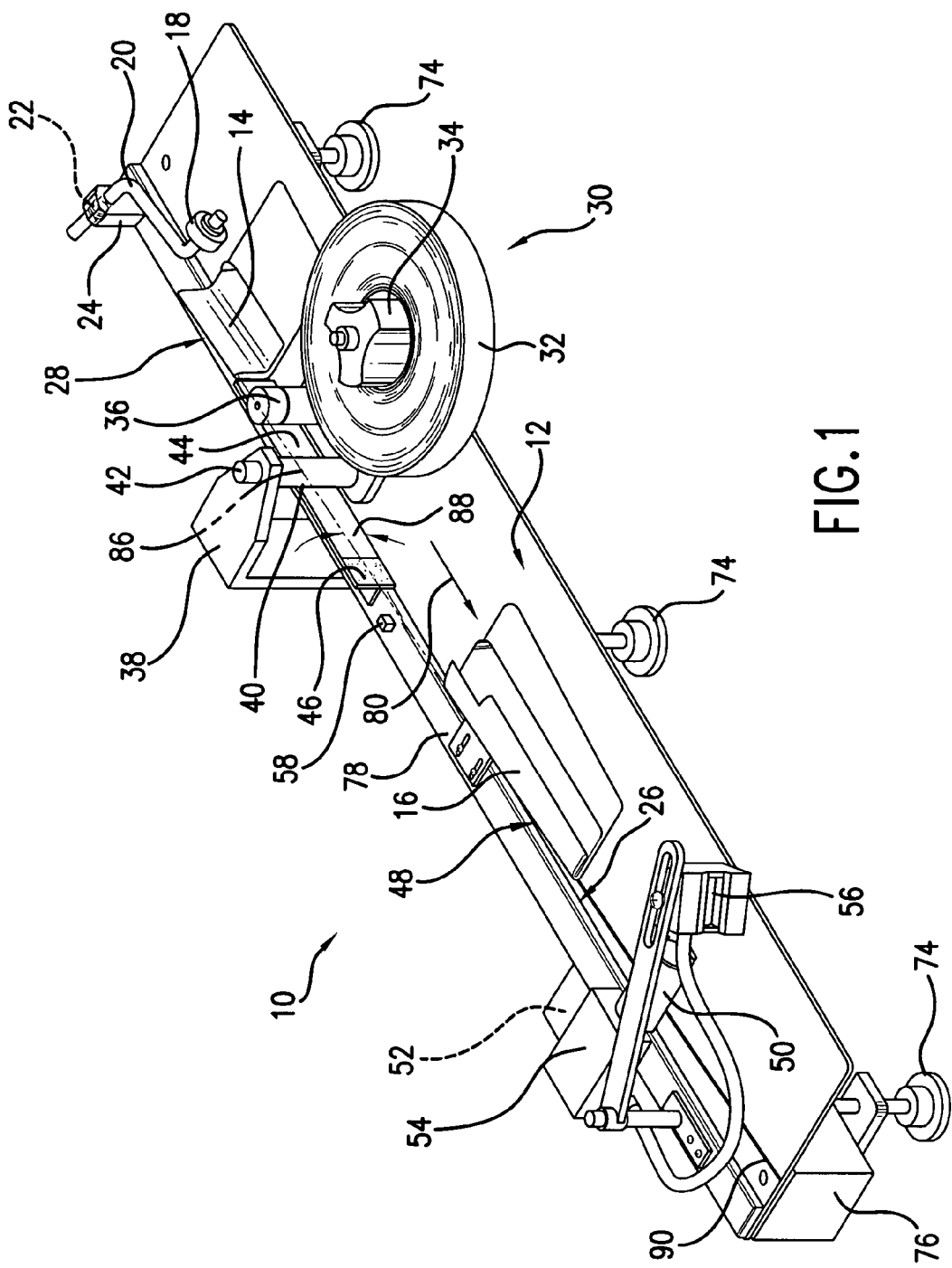
FIG. 1 is a perspective view of an apparatus for forming hems with double sided tape in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an apparatus 10 for use in applying double sided tape 32 to a banner 62 in order to form a hem 68 thereon. The apparatus 10 includes a prefolder 14 and a long arm hemmer 16 for folding the banner 62 and positioning the double sided tape 32 at a proper location. A driving roller 50 is also used in order to pull the banner 62 in the machine direction 80 of the apparatus 10 and to apply pressure to the banner 62 and double sided tape 32 to thus form the hem 68. The apparatus 10 may be capable of making hems 68 in banners 62 with a speed at least two to four times faster than that of hand application. Further, the apparatus may be capable of producing consistently straighter, more accurate and neater hems 68 than through manual application in certain circumstances. An associated method of forming a hem 68 with double sided tape 32 in a banner 62 is also provided.

FIG. 1 shows an apparatus 10 that includes a horizontal surface 12. The apparatus 10 can be attached via a series of clamps 74 to an edge of a table or other structure. In accordance with other exemplary embodiments of the present invention, the horizontal surface 12 is not present in apparatus 10. Here, the table or other working surface functions as the horizontal surface 12 of FIG. 1. The apparatus 10 includes a linear edge 26 that runs along substantially the entire length of the apparatus 10 in the machine direction 80. Linear edge 26 may be oriented so as to be parallel to the edge of the table to which the apparatus 10 is attached. Linear edge 26 may be of any height, and in certain exemplary embodiments may be from ¼ to one inch.

Figure 2:
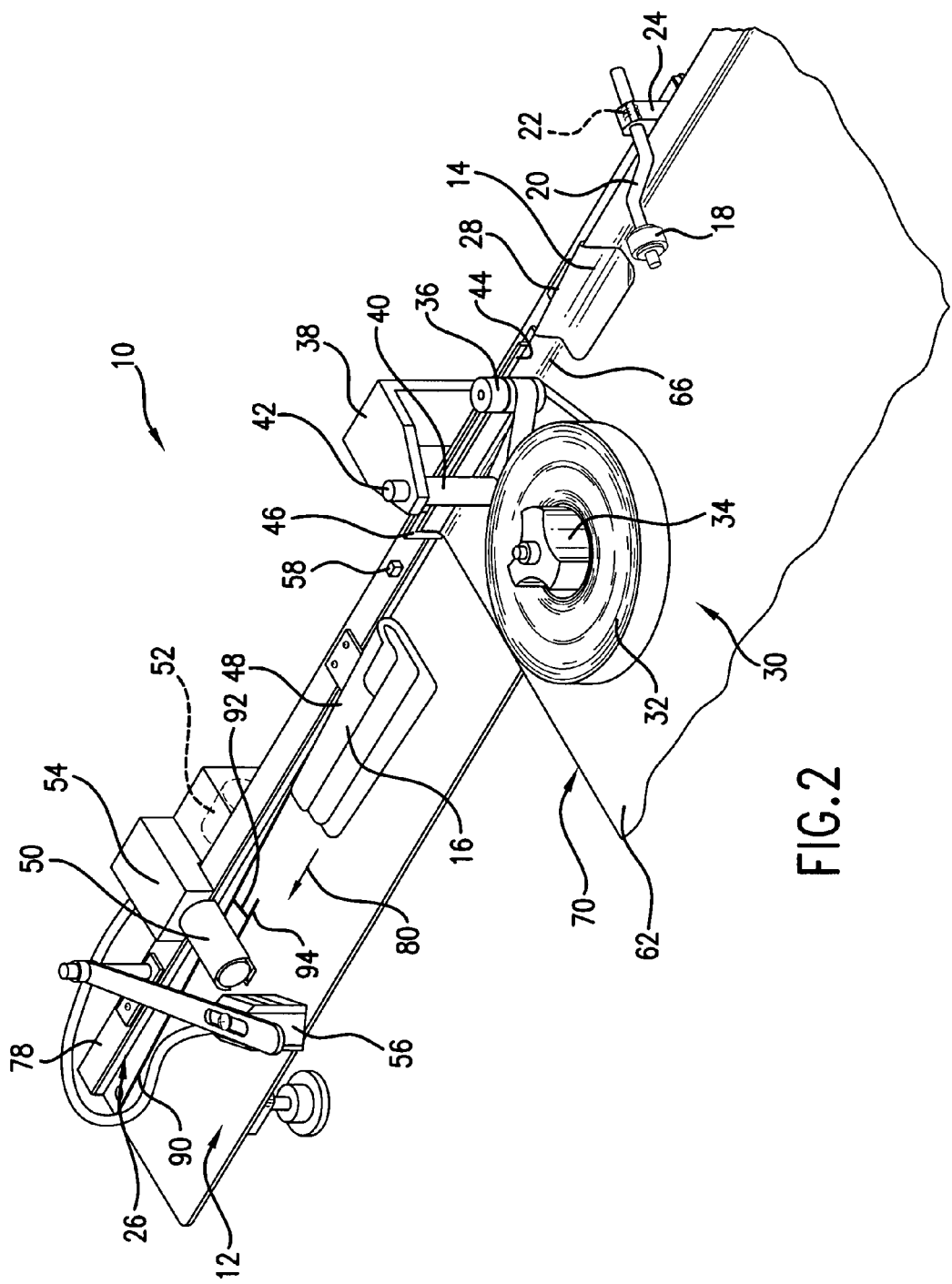
FIG. 2 is a perspective view of the apparatus of FIG. 1 with a leading edge of a banner positioned proximate to a taping station.

A tracking roller 18 is shown engaging the horizontal surface 12. The tracking roller 18 is mounted onto an arm 20 that is in turn mounted onto a post 24. Arm 20 is biased downwards towards the horizontal surface 12 through the presence of a spring 22 located inside of post 24. Any type of spring 22 may be used to bias the arm 20 and hence tracking roller 18 to a downward position. In accordance with one exemplary embodiment, the spring 22 is a memory steel spring on a flattened cam. The user can pull the arm 20 upwards in order to create a gap between the horizontal surface 12 and the tracking roller 18 when first positioning a banner 62 into the apparatus 10. Here, a user will slide the banner 62 between the horizontal surface 12 and tracking roller 18 and position the leading edge 70 of banner 62 into a prefolder 14. Prefolder 14 acts to create a crease 66 proximate one edge of the banner 62 and thus form a fold as shown in FIG. 2. By hand, the user will feed the leading edge 70 of banner 62 through and out of prefolder 14.

After the banner 62 is properly positioned into prefolder 14, the user can release arm 20 and allow tracking roller 18 to engage the upper surface of banner 62. Spring 22 acts to force tracking roller 18 down onto the banner 62. This action helps properly hold the banner 62 in the prefolder 14 so that the upper edge of the banner 62 is located proximate to the upper edge 28 of prefolder 14. If the tracking roller 18 were not present, the banner 62 would tend to fall downward in the prefolder 14 and thus not form the crease 66 at the proper location. Consequently, a crease 66 would be formed that is not at the desired distance from an edge of the banner 62 and may be angled or off line to the edge of banner 62. The upper edge 28 of the prefolder 14 is the portion of the prefolder 14 across which an edge of banner 62 and/or portion of the banner 62 extending from the edge is moved. The upper edge 28 may be an edge or a surface of the prefolder 14. Further, the upper edge 28 may be a cavity or other opening through which the banner 62 moves. Generally, the upper edge 28 is the portion of the prefolder 14 proximate to the edge of banner 62 and/or portion of banner 62 extending from the edge when the banner 62 is moved through or positioned in the prefolder 14.

The axis about which tracking roller 18 rotates is not perpendicular to the linear edge 26 but is instead positioned at an angle thereto. In accordance with various exemplary embodiments of the present invention, the axis about which tracking roller 18 rotates is oriented at an angle from 60° to 85° to the linear edge 26. This angular orientation helps properly guide the banner 62 into the prefolder 14. Although described as being oriented at an angle, it is to be understood that the tracking roller 18 may rotate about an axis that is 90° and hence perpendicular to the linear edge 26 in accordance with other exemplary embodiments.

Once the leading edge 70 is passed through the prefolder 14, the leading edge 70 is moved into a tape station 30 of apparatus 10. Tape station 30 has a tape roll holder 34 that holds double sided tape 32. The double sided tape 32 has adhesive on both sides with a paper backing. The paper can be retained on the adhesive on both sides of the double sided tape 32 when located on the tape roll holder 34. However, in accordance with one exemplary embodiment, the paper covers only one side of the double sided tape 32 when held by the tape roll holder 34. The tape station 30 is mounted onto a mounting bracket 38 of the apparatus 10. In this regard, tape station 30 is attached to a mounting post 42 responsible for attaching the tape station 30 to mounting bracket 38 and allowing the tape station 30 to swivel with respect to the mounting bracket 38. A tape roller 40 is located circumferentially around the mounting post 42 and rotates, but does not swivel with respect to the mounting bracket 38. The tape station 30 also includes a guide and pressure roller 36.

The tape roll holder 34 and the guide and pressure roller 36 are capable of swiveling with respect to the mounting post 42. These components are swiveled out of the way when moving the leading edge 70 of the banner 62 into the tape station 30. In this regard, an opening is created between the guide and pressure roller 36 and a non-stick surface 44 located adjacent the linear edge 26. The non-stick surface 44 can be made of TEFLON (in accordance with one exemplary embodiment of the present invention. A surface 46 is present adjacent the non-stick surface 44 and is located on its downstream side in the machine direction 80. A leading edge of the double sided tape 32 that had adhesive exposed is stuck to surface 46 when the leading edge 70 of double sided tape 32 is positioned into the tape station 30.

The user can next properly attach the leading edge of the double sided tape 32 onto the banner 62 so that the double sided tape 32 is positioned a desired distance from and parallel to the edge of the banner 62. In accordance with one exemplary embodiment, the double sided tape 32 is attached approximately $\frac{1}{8}^{th}$ of an inch down from the edge of the banner 62. After attachment, the tape roll holder 34 and guide and pressure roller 36 are swiveled with respect to the mounting bracket 38 in order to urge the guide and pressure roller 36 onto the banner 62 and against the non-stick surface 44. If needed, any slack in the double sided tape 32 can be taken up. Pulling of the banner 62 in the machine direction 80 causes the attached double sided tape 32 to likewise be pulled in the machine direction 80. Additional double sided tape 32 on the tape roll holder 34 will be unrolled therefrom and pulled around the guide and pressure roller 36. The double sided tape 32 will then be applied to the banner 62 through compressive forces of the guide and pressure roller 36.

Figure 3:
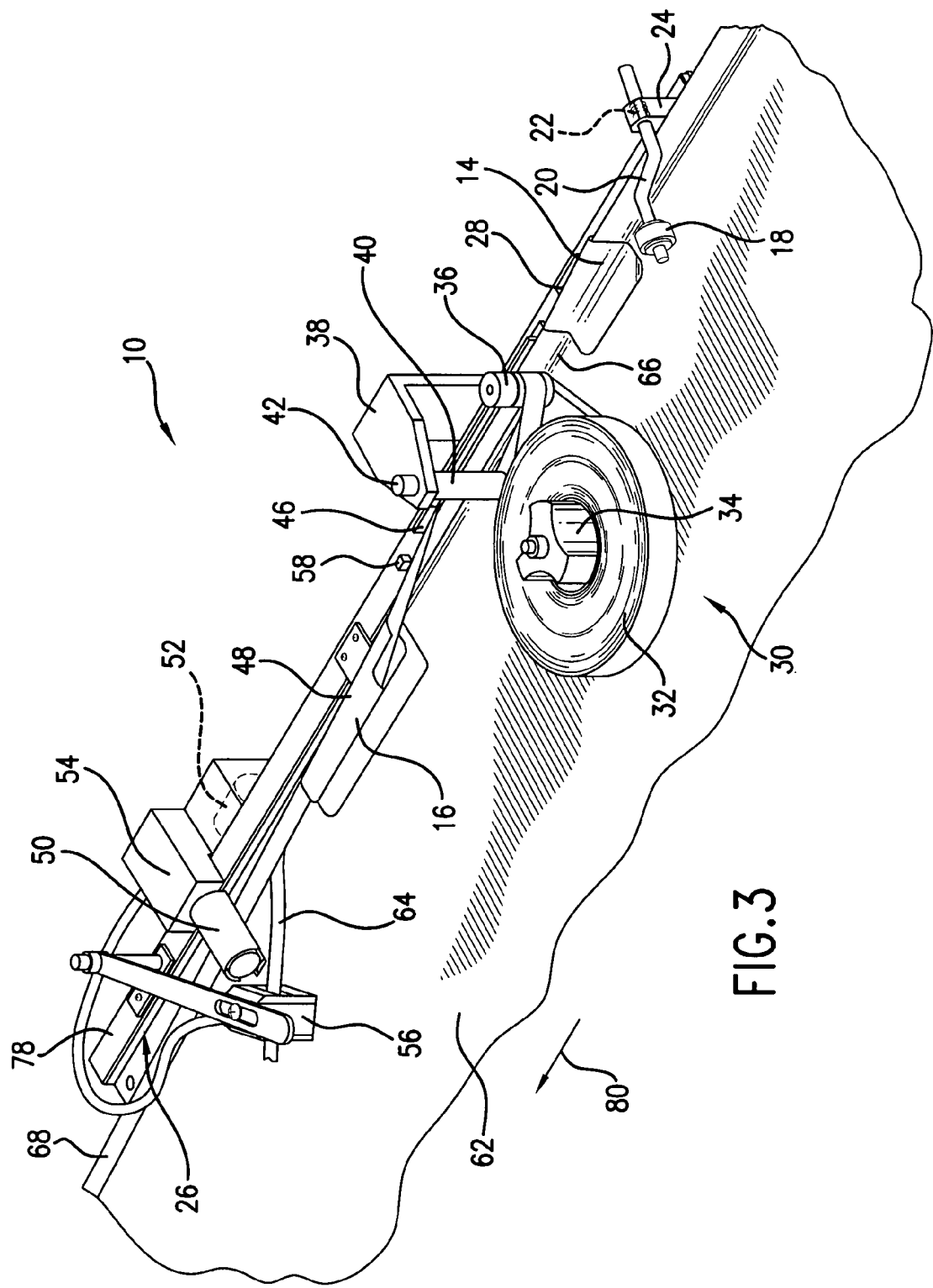
FIG. 3 is a perspective view of the apparatus of FIG. 1 with a banner positioned through the apparatus and having double sided tape and a hem applied thereon.

With reference now to FIGS. 1 and 3, the leading edge 70 of banner 62 is next manipulated by the user so as to be positioned into a long arm hemmer 16. The long arm hemmer 16 acts to further bend the banner 62 so that upon exiting, the edge of the banner 62 is folded over onto itself and on top of the applied double sided tape 32. The user can next pull the banner 62 into contact with a driving roller 50. In order to form a hem 68 in the banner 62, double sided tape paper 64 that covers one side of the adhesive of the double sided tape 32 must be removed so that the folded portion of the banner 62 can be attached to the adhesive of the double sided tape 32. The hem 68 can thus be formed upon compressing and causing adhesion of the folded portion of the banner 62 and the double sided tape 32. The upper edge 48 of the long arm hemmer 16 is the portion of the long arm hemmer 16 across which an edge of banner 62 and/or portion of the banner 62 extending from the edge is moved. The upper edge 48 may be an edge or a surface of the long arm hemmer 16. Further, the upper edge 48 may be a cavity or other opening through which the banner 62 moves. Generally, the upper edge 48 is the portion of the long arm hemmer 16 proximate to the edge of banner 62 and/or portion of banner 62 extending from the edge when the banner 62 is moved through or positioned in the long arm hemmer 16.

The double sided tape paper 64 can then be inserted into a tape removal roller 56. The double sided tape paper 64 is removed after the long arm hemmer 16 in the exemplary embodiment shown. Here, the double sided tape paper 64 is pulled by the tape removal roller 56. The double sided tape paper 64 can be wound onto the tape removal roller 56 or can simply be removed therefrom and discarded as desired in accordance with certain exemplary embodiments. The tape removal roller 56 may be independently rotated in certain embodiments in order to assist in the removal of the double sided tape paper 64. It is to be understood that other exemplary embodiments exist in which the double sided tape paper 64 is not present. Here, the user or another individual may pull the double sided tape paper 64 from the double sided tape 32 manually during operation of the apparatus 10.

After the double sided tape paper 64 is removed from the double sided tape 32, the banner 62 is moved underneath a driving roller 50 in order to compress the banner 62 down onto the horizontal surface 12 and cause a hem 68 to be formed when the banner 62 is compressed onto and adhered to the double sided tape 32. The driving roller 50 is powered by a motor 52 that is attached to the side of the apparatus 10 though a mounting 54. Any type of motor 52 can be used in the apparatus 10. The motor 52 can be actuated by a foot pedal or a switch in accordance with various exemplary embodiments. Further, the motor 52 can be reversible in additional embodiments so that the rotation of the driving roller 50 can be reversed in order to move the banner 62 in the direction opposite to the machine direction 80.

Figure 4:
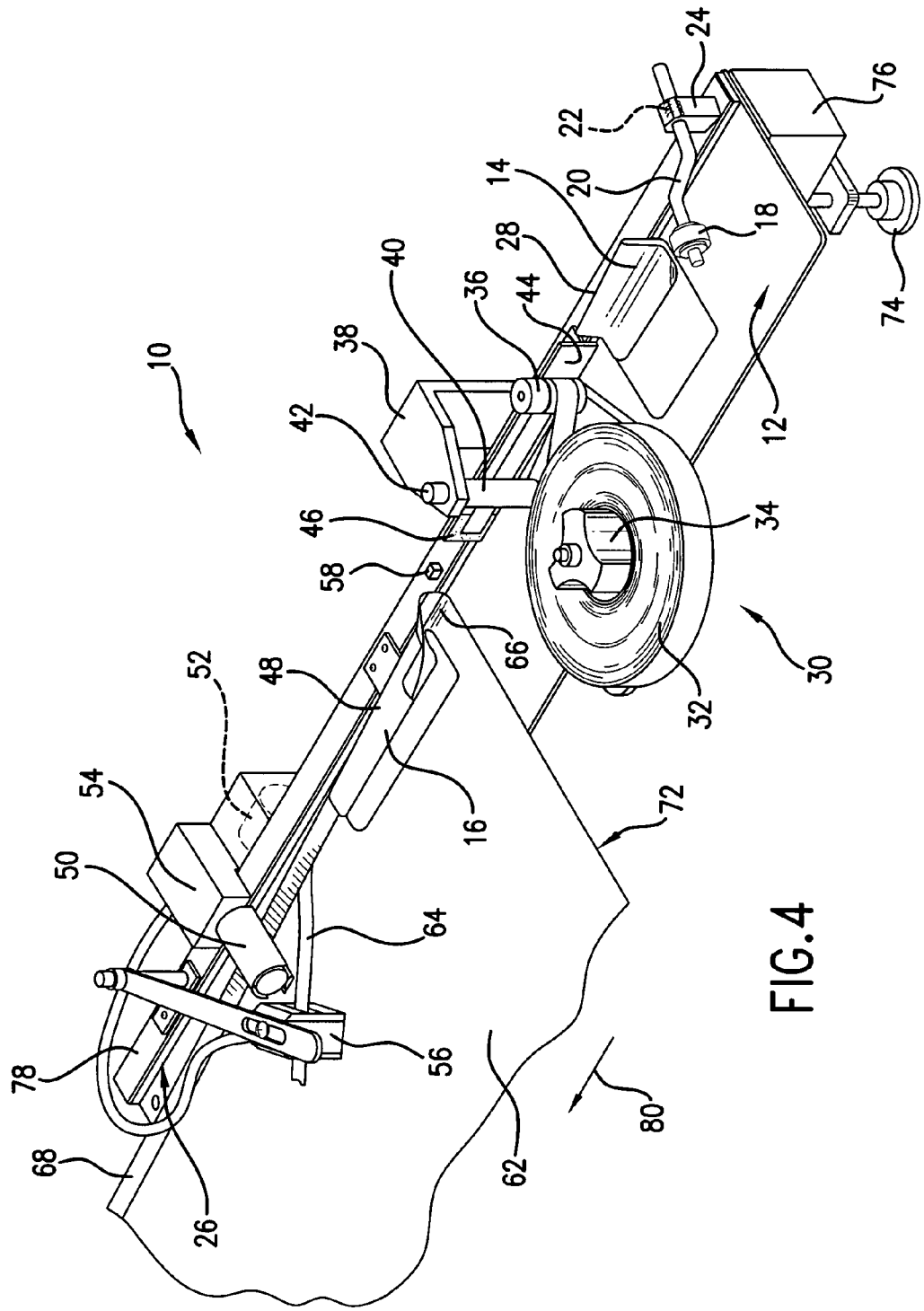
FIG. 4 is a perspective view of the apparatus of FIG. 1 with the tailing edge of the banner positioned just before a long arm hemmer and before the tearing of the double sided tape therefrom.

The driving roller 50 forms a nip with the horizontal surface 12 and pulls the banner 62 in the machine direction 80 in addition to compressing the banner 62 to effect attachment of the double sided tape 32 to form hem 68. Once initially set up, the apparatus 10 functions automatically in pulling the banner 62 therethrough, unrolling the double sided tape 32, and forming hem 68. With reference now to FIG. 4, the tailing edge 72 is positioned between the tape station 30 and the long arm hemmer 16. At this point, a stop sensor 58 may be present in order to detect the fact that the tailing edge 72 of the banner 62 has entered this location. The double sided tape 32 can then be cut so that no further double sided tape 32 is unrolled from the tape roll holder 34. The leading edge of the double sided tape 32 can then be attached to the surface 46 to await application to the next banner 62 to pass through apparatus 10. Although a stop sensor 58 is shown, it need not be present in other embodiments. In these instances, the user may simply visually note the fact that the tailing edge 70 has double sided tape 32 applied thereto and may manually stop the motor 52 and hence driving roller 50 to stop the advance of banner 62 to tear off the double sided tape 32.

Once the double sided tape 32 is cut, the motor 52 can be restarted to rotate the driving roller 50 and pull the remaining portion of the banner 62 from the apparatus 10 to complete formation of hem 68. The double sided tape 32 at the taping station 30 can be easily removed from the non-stick surface 44 as the tape roll holder 34 and the guide and pressure roller 36 are swung away from the linear edge 26 to reset the apparatus 10. The banner 62 can be subsequently reinserted through the apparatus 10 if additional hems 68 are desired. The apparatus 10 can thus apply double sided tape 32 to the banner 62, fold a hem 68, remove the double sided tape paper 64 and press down on the hem 68 in a single operation. After application of the hems 68, the banner can then be finished by having grommets inserted through the hems 68 as desired.

The apparatus 10 can be constructed in order to form a hem 68 that is straight across the edge of the banner 62. Further, the apparatus 10 can be arranged so that the double sided tape 32 is applied in a straight line across the banner 62 so that the hem 68 is made without exposing any of the double sided tape 32 in the finished product. Various components of the apparatus 10 can be arranged in order to achieve a straight hem 68. Referring now to FIG. 5, a top view of the apparatus 10 is shown. The prefolder 14 and the long arm hemmer 16 are shown to be oriented outwardly from the linear edge 26. More specifically, the upper edge 28 of prefolder 14 and the upper edge 48 of long arm hemmer 16 are oriented at an angle 84 with respect to the linear edge 26. The upper edges 28 and 48 lie along a line 82 which is also oriented at an angle 84 with respect to the linear edge 26. The portions of the banner 62 at the upper edges 28 and 48 are thus oriented at an angle 84 with respect to the linear edge 26 when moving through the apparatus 10. It may be the case, however, that portions of the banner 62 before or after the upper edges 28 and 48 may or may not be oriented at an angle 84 to the linear edge 26. In accordance with certain exemplary embodiments of the present invention, angle 84 may be from 0.25° to 5°. In accordance with one exemplary embodiment of the present invention, angle 84 is 0.7°. As shown, the line 82 is located at a maximum distance of approximately $\frac{3}{8}^{th}$ of an inch from the linear edge 26 at the driving roller 50. The line 82 also extends for approximately twenty nine inches along the length of the horizontal surface 12 in one embodiment.

A series of lines are located on the horizontal surface 12 in order to assist the user in properly positioning and stopping the banner 62 during use of the apparatus 10. A guide line 90 is shown and extends at an angle to the linear edge 26. Guide line 90 is present in order to assist the user in properly aligning the banner 62 as it is moved into and out of the driving roller 50. A stop line 92 is also included and is located between the long arm hemmer 16 and the driving roller 50. The stop line 92 provides a reference point to aid the user in stopping the banner 62 at a stop point before passing the banner 62 through the driving roller 50. At this point the user may remove tape paper from the double sided tape 32 for removal with rollers 56. Also included is a hem line 94 to aid the user in folding the banner 62 to form a hem 68 of a desired size. The lines 90, 92 and 94 can be made with tape colored different than the horizontal surface 12 or may be painted onto the horizontal surface 12 in accordance with various embodiments.

Referring now to FIG. 6, selected components of the apparatus 10 are shown in a side view in order to display their angular relationship. As shown, the upper edges 28 and 48 are aligned along a line 86 that has an end at the nip formed between the driving roller 50 and the horizontal surface 12. Line 86 is oriented at an angle 88 to the horizontal surface 12 so that both of the upper edges 28 and 48 of the prefolder 14 and long arm hemmer 16 are also at an angle 88 to horizontal surface 12. The portions of banner 62 located at the upper edges 28 and 48 are also oriented at an angle 88 to the horizontal surface 12. However, other portions of the banner 62 before and after the upper edges 28 and 48 may or may not be oriented at an angle 88. Angle 88 may be from 2° to 10° in accordance with various exemplary embodiments of the present invention. In accordance with one exemplary embodiment, angle 88 is 4.8°. As shown, the line 86 has a maximum height at the right hand side of the upper edge 28 of approximately two inches and extends a distance of approximately twenty nine inches along the length of the horizontal surface 12 in one embodiment.

The upper edges 28 and 48 are oriented at angles 84 and 88 in order to cause the hem 68 to be formed in a straight line. Applicant has discovered the fact that angles 84 and 88 act to advantageously guide the banner 62 so that the hem 68 and double sided tape 32 are tracked in a straight, desirable line. The angles 84 and 88 also act to self correct the banner 62 and double sided tape 32. In this regard, if the double sided tape 32 were not initially applied in a straight line, or if the edge of the banner material 62 was not initially folded over to form a straight hem 68, the apparatus 10 acts to self correct the construction of hem 68. The angles 84 and 88 function to force the hem 68 to be formed in a straight line along with the double sided tape 32 to be applied in a linear manner along the banner material 62. This self correcting may be advantageous in that otherwise a small error in alignment of the hem 68 will propagate over the length of several feet of material to result in a hem 68 that is undesirably unaligned. Although described as being oriented at angles 84 and 88 to form a straight, self correcting hem 68, the apparatus 10 may be constructed in other exemplary embodiments so that one or both of the angles 84 and 88 are not present when constructing a hem 68.

Figure 7:
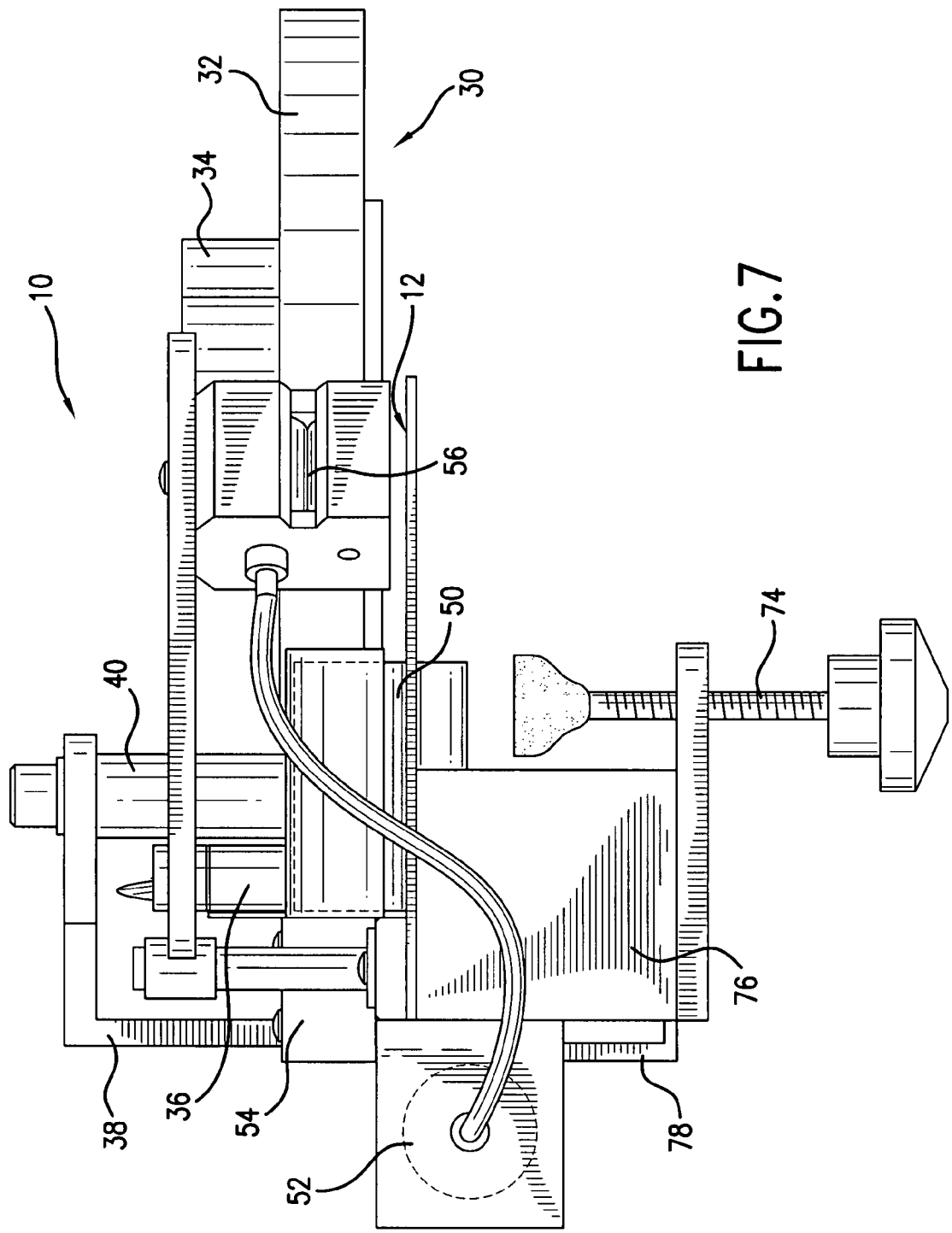
FIG. 7 is a front view of the apparatus of FIG. 1.

FIG. 7 shows a front view of the apparatus 10. The apparatus 10 shown in FIGS. 1-7 is used for constructing hems 68 of one inch. The height of apparatus 10 is approximately six inches and its width is approximately one foot. In addition, the length of apparatus 10 is four feet. If larger or smaller hems 68 are desired, the size of various components of the apparatus 10 will be correspondingly adjusted. However, the angular set up of the prefolder 14 and long arm hemmer 16 will be maintained in order to preserve the formation of a straight hem 68. In this regard, the angle 84 may be 0.7° and the angle 88 may be 4.8° even though the various length, widths and heights of the prefolder 14 and long arm hemmer 16 are increased or decreased.

FIG. 7 also shows a clamp 74 that can be used to attach the apparatus 10 to an edge of a table or other working surface. A frame 78 used to carry various components such as mounting 54 and mounting bracket 38 is also present. A support member 76 is further included in order to provide structural support to the apparatus 10. It is to be understood, however, that other exemplary embodiments exist in which the presence and/or configuration of these components may be varied. Also, in other exemplary embodiments the apparatus 10 can be provided with additional features. For example, a mechanism for automatically feeding the leading edge 70 of banner 62 can be provided to further reduce manual labor necessary in forming hem 68. Also, lighting and/or automatic cutting of the double sided tape 32 may be employed in alternative exemplary embodiments. Finally, a prefabricated table kit can be provided in yet other exemplary embodiments. The apparatus 10 can be made to be a relatively low profile unit.

Although described as being used to form hems 68 in banners 62, the apparatus 10 can be used to form hems 68 for other items besides banners. The banners 62 used are generally made of laminated vinyl and have various widths and heights. As an example, a typical banner 62 is a woven polyester scrim laminated with vinyl and totals ten ounces per square yard. Such a material is commonly referred to as ten ounce vinyl. Other common weights of vinyl material are twelve ounces, thirteen ounces, fifteen ounces, sixteen ounces and eighteen ounces. Other types of materials used for finished banners are also known that have different types of scrims that allow for a smoother finished product. Certain ones of these scrims have a black blocking film inside referred to as block out material. The block out material prevents shadowing from front to back on two-sided printed applications. Some banner products such as film polypropylene or woven polypropylene do not have scrim. These types of products tend not to be as durable as scrim supported vinyl.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An apparatus for forming a hem, comprising:
a horizontal surface for supporting a surface of a banner;
a linear edge positioned on said horizontal surface;
a prefolder for applying a prefold to a banner, the prefolder offset from the linear edge at an angle of between 0.25° to 5°, the prefolder further defining an upper edge defining an angle from 2° to 10° relative to the horizontal surface and an entrance of the prefolder positioned closer to the linear edge than an exit of the prefolder;
a tape station for use in application of tape to a banner;
a hemmer for use in folding the banner, the hemmer offset from the linear edge at an angle of between 0.25° to 5°, the hemmer further defining an upper edge defining an angle from 2° to 10° relative to the horizontal surface and an entrance of said hemmer positioned closer to the linear edge than an exit of the hemmer;
a driving roller for use in moving the banner and for use in compressing the banner and the tape to form a hem said driver roller having an axis of revolution perpendicular to said linear edge; and
wherein when a banner is fed through the apparatus, the tape and the formed hem are positioned to correctly align and maintain a straight line relative to each other.

2. The apparatus as set forth in claim 1, wherein said tape station is located downstream from said prefolder in the machine direction, wherein said hemmer is located downstream from said tape station in the machine direction, and wherein said driving roller is located downstream from said hemmer in the machine direction.

3. The apparatus as set forth in claim 1, further comprising a tracking roller located upstream from said tape station in the machine direction, wherein said tracking roller is biased so as to compress the banner, and wherein the axis of rotation of said tracking roller is at an angle to the machine direction such that the axis of rotation of said tracking roller is not perpendicular to the machine direction.

4. The apparatus as set forth in claim 1, wherein said tape station has a tape roll holder for holding wound tape, wherein said tape station has a guide pressure roller across which the tape is moved, wherein said tape station has a non-stick surface disposed next to said guide pressure roller such that the tape is capable of being moved between said non-stick surface and said guide pressure roller, wherein said non-stick surface is made of a material that discourages sticking of the tape thereto, and wherein said tape station has a surface located downstream from said non-stick surface in the machine direction, wherein the tape is capable of being attached to said surface for subsequent disengagement from said surface and attachment to the banner.

5. The apparatus as set forth in claim 1, further comprising:
a tape removal roller for receiving tape paper from the tape removed from an adhesive portion of the tape at a location downstream from said hemmer in the machine direction; and
a stop sensor capable of detecting the fact that the trailing edge of the banner has exited said tape station, wherein upon detecting the fact that the trailing edge of the banner has exited said tape station said stop sensor produces a signal that causes said driving roller to not rotate.

6. The apparatus as set forth in claim 1, wherein
said upper edge of said hemmer and said upper edge of said prefolder are positioned at identical angles with respect to said horizontal surface so that an edge of the banner is guided towards said horizontal surface as the banner moves across said hemmer in the machine direction.

7. The apparatus as set forth in claim 1, further comprising a horizontal surface supporting the banner, wherein said horizontal surface has a guide line to aid a user in positioning the banner on the horizontal surface, wherein said horizontal surface has a stop line located between said hemmer and said driving roller to aid a user in positioning the banner at a stop point before passing the banner across said driving roller, and wherein said horizontal surface has a hem line to aid a user in folding the banner to form a hem of a desired size.

8. An apparatus for forming a hem, comprising:
a banner;
a horizontal surface for supporting a surface of the banner;
a linear edge positioned on said horizontal surface;
a prefolder for applying a prefold to a banner, the prefolder offset from the linear edge at an angle of between 0.25° to 5°, the prefold further defining an upper edge defining an angle from 2° to 10° relative to the horizontal surface and an entrance of the prefolder positioned closer to the linear edge than an exit of the prefolder;
a tape station for use in application of tape to the banner;
a hemmer for use in folding the banner, the hemmer offset from the linear edge at an angle of between 0.25° to 5°, the hemmer further defining an upper edge defining an angle from 2° to 10° relative to the horizontal surface and an entrance of said hemmer positioned closer to the linear edge than an exit of the hemmer;
a driving roller for use in moving the banner and for use in compressing the banner and the tape to form a hem, said driver roller having an axis of revolution perpendicular to said linear edge; and
wherein when the banner is fed through the apparatus, the tape and the formed hem are positioned to correctly align and maintain a straight line relative to each other.

9. The apparatus as set forth in claim 8, wherein said driving roller is for use in moving the banner and for use in compressing the banner and the tape, wherein said driving roller is located downstream from said hemmer in the machine direction.

10. The apparatus as set forth in claim 8, further comprising a tracking roller located upstream from said prefolder in the machine direction, wherein said tracking roller is biased so as to compress the banner, and wherein the axis of rotation of said tracking roller is at an angle to the machine direction such that the axis of rotation of said tracking roller is not perpendicular to the machine direction.

11. The apparatus as set forth in claim 8, wherein said tape station has a tape roll holder for holding wound tape, wherein said tape station has a guide pressure roller across which the tape is moved, wherein said tape station has a non-stick surface disposed next to said guide pressure roller such that the tape is capable of being moved between said non-stick surface and said guide pressure roller, wherein said non-stick surface is made of a material that discourages sticking of the tape thereto, and wherein said tape station has a surface located downstream from said non-stick surface in the machine direction, wherein the tape is capable of being attached to said surface for subsequent disengagement from said surface and attachment to the banner.

12. The apparatus as set forth in claim 8, further comprising:
a tape removal roller for receiving tape paper from the tape removed from an adhesive portion of the tape at a location downstream from said hemmer in the machine direction; and
a stop sensor capable of detecting the fact that the trailing edge of the banner has exited said tape station, wherein upon detecting the fact that the trailing edge of the banner has exited said tape station said stop sensor produces a signal that causes said driving roller to not rotate.

13. The apparatus as set forth in claim 8, wherein said prefolder has an upper edge across which the banner moves, wherein said upper edge of said prefolder is oriented at an angle with respect to said linear edge so that the banner is not parallel to said liner edge when the banner moves across said upper edge of said prefolder.

14. The apparatus as set forth in claim 8 wherein said upper edge of said hemmer and said upper edge of said prefolder are positioned in the same plane and at an angle relative to the horizontal surface so that an edge of the banner is guided towards said horizontal surface as the banner moves across said hemmer in the machine direction.

* * * * *